(12) United States Patent
Suyama (10) Patent No.: US 8,011,675 B2
(45) Date of Patent: Sep. 6, 2011

(54) EXPANSION ACTUATOR

(75) Inventor: Koichi Suyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 12/447,582

(22) PCT Filed: Nov. 28, 2007

(86) PCT No.: PCT/JP2007/072942
§ 371 (c)(1),
(2), (4) Date: Apr. 28, 2009

(87) PCT Pub. No.: WO2008/081665
PCT Pub. Date: Jul. 10, 2008

(65) Prior Publication Data
US 2010/0066040 A1 Mar. 18, 2010

(30) Foreign Application Priority Data
Dec. 29, 2006 (JP) ................................ 2006-356683

(51) Int. Cl.
*B62D 7/20* (2006.01)
*B62D 17/00* (2006.01)

(52) U.S. Cl. ........... 280/5.522; 280/86.757; 280/86.758; 74/89.34

(58) Field of Classification Search ............... 280/5.521, 280/5.522, 86.758, 86.751, 86.757; 74/89.34, 74/89.35, 89.37, 89.4, 89.41, 89.23; 188/129, 188/134
See application file for complete search history.

(56) References Cited

U.S. PATENT DOCUMENTS

| 4,973,070 | A  | * | 11/1990 | Menichini et al. | ......... | 280/5.521 |
| 5,912,520 | A  | * | 6/1999  | Kobayashi et al. | ............. | 310/80 |
| 7,766,345 | B2 | * | 8/2010  | Hakui et al. | ................ | 280/5.521 |
| 7,766,350 | B2 | * | 8/2010  | Terada et al. | ............ | 280/86.757 |
| 7,802,488 | B2 | * | 9/2010  | Bucheton et al. | ............ | 74/89.23 |
| 2004/0124727 | A1 | * | 7/2004 | Lau | .................. | 310/83 |
| 2005/0051988 | A1 | * | 3/2005 | Gradu et al. | ........... | 280/124.134 |
| 2005/0155444 | A1 | * | 7/2005 | Otaki et al. | ...................... | 74/89 |
| 2007/0290473 | A1 | * | 12/2007 | Buma | .................... | 280/124.106 |

(Continued)

FOREIGN PATENT DOCUMENTS

JP 6-47388 6/1994

(Continued)

*Primary Examiner* — Paul Dickson
*Assistant Examiner* — Drew Brown
(74) *Attorney, Agent, or Firm* — Rankin, Hill & Clark LLP (57) ABSTRACT

In an expansion actuator employing a screw feed mechanism, when a screw feed mechanism (60) formed from a male thread member (58) and a female thread member (59) that are screwed one into the other is driven by a motor (33) via a reduction gear (44), relative displacement between the male thread member (58) and the female thread member (59) in the direction of an axis (L) can be outputted as expansion and contraction due to relative movement of first and second housings (31, 32). Since the screw feed mechanism (60) is disposed so as to surround outer peripheries of the motor (33) and the reduction gear (44), which are disposed on the axis (L), compared with a case in which the motor (33), the reduction gear (44), and the screw feed mechanism (60) are disposed in series on the axis (L), it is possible to make the dimension of the expansion actuator (14) in the axis (L) direction smaller.

3 Claims, 8 Drawing Sheets

U.S. PATENT DOCUMENTS

2008/0157612 A1* 7/2008 Suyama et al. .................. 310/83

FOREIGN PATENT DOCUMENTS

| JP | 7-123631 | 5/1995 |
| --- | --- | --- |
| JP | 2003-209952 | 7/2003 |
| JP | 2003-250246 | 9/2003 |
| JP | 2003-529027 | 9/2003 |
| JP | 2005-170064 | 6/2005 |
| JP | 2005-297839 | 10/2005 |
| JP | 2007-151367 | 6/2007 |
| JP | 2007-154955 | 6/2007 |

* cited by examiner

EXPANSION ACTUATOR

TECHNICAL FIELD

The present invention relates to an expansion actuator in which a screw feed mechanism formed from a male thread member and a female thread member that are screwed one into the other is driven by a motor via a reduction gear, and relative displacement between the male thread member and the female thread member in the direction of an axis is outputted as a thrust force.

BACKGROUND ART

An arrangement in which expansion and contraction of an upper link and a lower link of a vehicular suspension system are controlled by an actuator to thus enhance drivability by suppressing changes in camber angle or contact patch accompanying bumping and rebounding of a wheel, the actuator being formed from a screw feed mechanism that includes a male thread member and a female thread member that are rotated relative to each other by a motor, is known from Patent Publication 1 below.

Patent Publication 1: Japanese Patent Publication No. 6-47388

DISCLOSURE OF INVENTION

Problems to be Solved by the Invention

In the above-mentioned conventional arrangement, rotation of the motor is transmitted directly to the screw feed mechanism; when a reduction gear is disposed between the motor and the screw feed mechanism, if the motor, the reduction gear, and the screw feed mechanism are disposed in series, the actuator is long in the axial dimension, and there is a possibility of impairing the degree of freedom in layout when installed in a vehicle body.

The present invention has been accomplished in the light of the above-mentioned circumstances, and it is an object thereof to reduce the axial dimension of an expansion actuator employing a screw feed mechanism.

Means for Solving the Problems

In order to attain the above object, according to a first aspect of the present invention, there is provided an expansion actuator in which a screw feed mechanism formed from a male thread member and a female thread member that are screwed one into the other is driven by a motor via a reduction gear, and relative displacement between the male thread member and the female thread member in the direction of an axis is outputted as a thrust force, characterized in that the motor and the reduction gear are disposed on the axis, and the screw feed mechanism is disposed so as to surround outer peripheries of the motor and the reduction gear.

Furthermore, according to a second aspect of the present invention, in addition to the first aspect, the reduction gear and the screw feed mechanism are connected via a resilient coupling.

Moreover, according to a third aspect of the present invention, in addition to the first or second aspect, the expansion actuator is a toe control actuator for changing the toe angle of a wheel of an automobile.

It should be noted here that a rear wheel W of an embodiment corresponds to the wheel of the present invention.

Effects of the Invention

In accordance with the first aspect of the present invention, when the screw feed mechanism formed from the male thread member and the female thread member that are screwed one into the other is driven by the motor via the reduction gear, it is possible to output a relative displacement between the male thread member and the female thread member in the direction of an axis as a thrust force. Since the screw feed mechanism is disposed so as to surround the outer peripheries of the motor and the reduction gear, which are disposed on the axis, compared with a case in which the motor, the reduction gear, and the screw feed mechanism are disposed in series on the axis, it is possible to make the axial dimension of the expansion actuator smaller.

Furthermore, in accordance with the second aspect of the present invention, since the reduction gear and the screw feed mechanism are connected via the resilient coupling, an automatic alignment function is exhibited in which a small axial displacement between the reduction gear and the screw feed mechanism is absorbed by resilient deformation of the resilient coupling, and a smooth transmission of power can be made possible by absorbing sudden changes in torque.

Moreover, in accordance with the third aspect of the present invention, since the small and lightweight expansion actuator is applied in the toe control actuator for changing the toe angle of the wheel of an automobile, it is possible to reduce the unsprung load of the suspension.

EXPLANATION OF REFERENCE NUMERALS AND SYMBOLS

14 Toe control actuator
33 Motor
44 Reduction gear
58 Male thread member
59 Female thread member
71 Screw feed mechanism
L Resilient coupling
L Axis
W Rear wheel (wheel)

BEST MODE FOR CARRYING OUT THE INVENTION

Modes for carrying out the present invention are explained below by reference to the attached drawings.

Embodiment 1

FIG. 1 to FIG. 5 show a first embodiment of the present invention.

Figure 1:
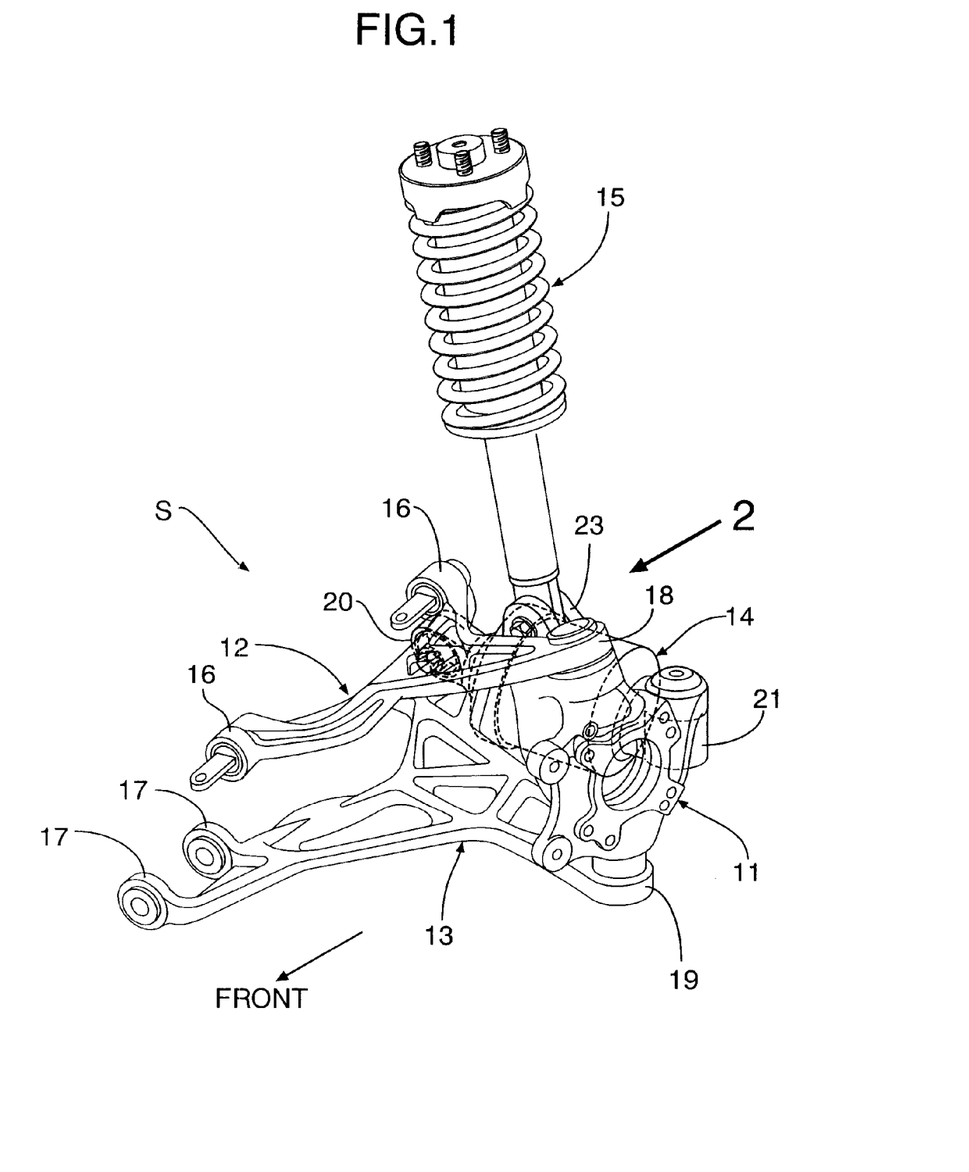
FIG. 1 is a perspective view of a suspension system for a rear left wheel related to a first embodiment. (first embodiment)
Figure 2:
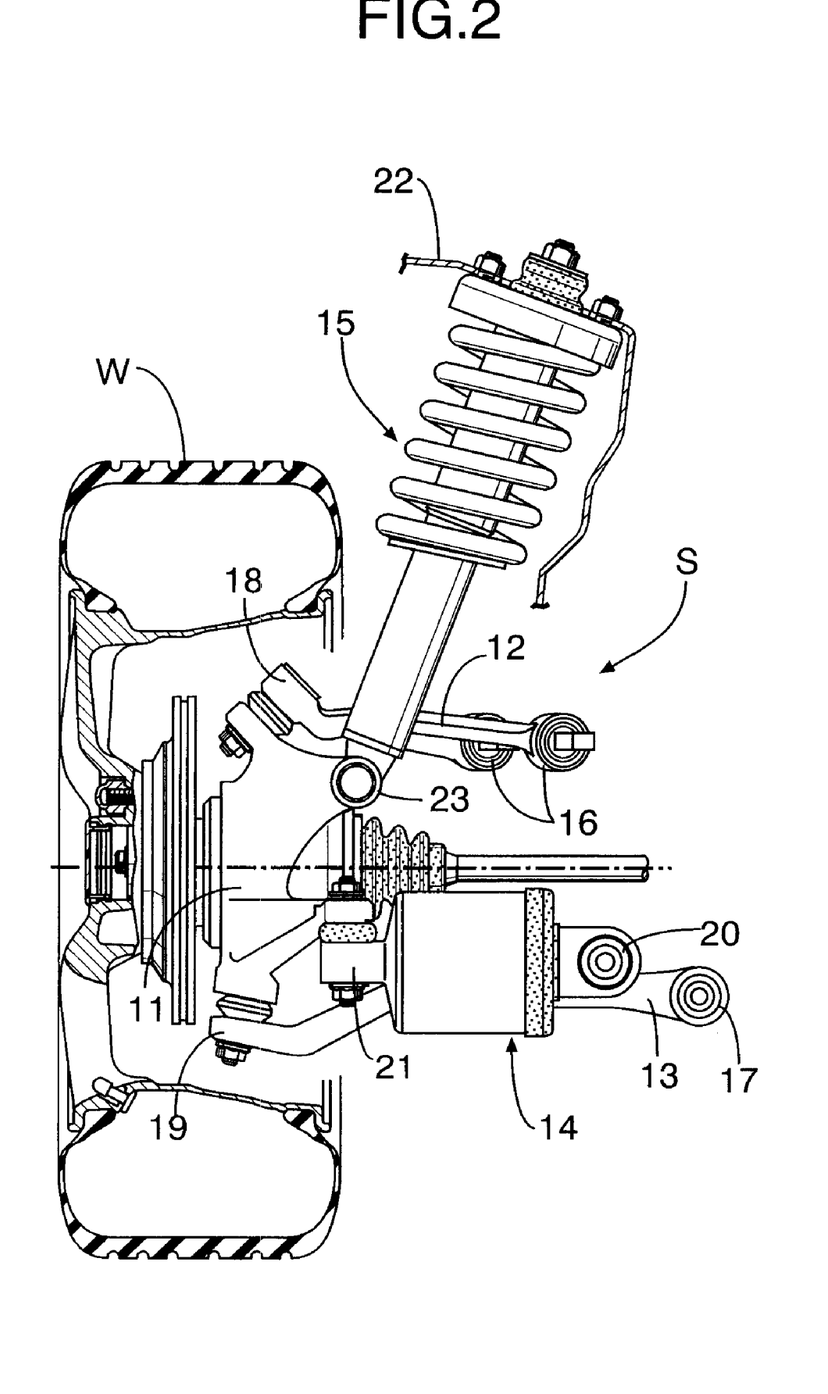
FIG. 2 is a view from arrow 2 in FIG. 1. (first embodiment)

As shown in FIG. 1 and FIG. 2, a double wishbone type rear suspension S of a four-wheel steering vehicle is formed from a knuckle 11 rotatably supporting a rear wheel W, an upper arm 12 and a lower arm 13 vertically movably connecting the knuckle 11 to a vehicle body, a toe control actuator 14 connecting the knuckle 11 and the vehicle body in order to control the toe angle of the rear wheel W, a suspension spring-equipped damper 15 for cushioning vertical movement of the rear wheel W, etc.

Extremities of the upper arm 12 and the lower arm 13 having base ends connected to the vehicle body via rubber bush joints 16 and 17 respectively are connected to an upper part and a lower part of the knuckle 11 via ball joints 18 and 19 respectively. The toe control actuator 14 has a base end connected to the vehicle body via a rubber bush joint 20, and an extremity connected to a rear part of the knuckle 11 via a rubber bush joint 21. The lower end of the suspension spring-equipped damper 15, which has its upper end fixed to the vehicle body (an upper wall 22 of a suspension tower), is connected to an upper part of the knuckle 11 via a rubber bush joint 23.

When the toe control actuator 14 is driven to expand, the rear part of the knuckle 11 is pushed outward in the vehicle width direction and the toe angle of the rear wheel W changes in a toe-in direction, and when the toe control actuator 14 is driven to contract, the rear part of the knuckle 11 is pulled inward in the vehicle width direction and the toe angle of the rear wheel W changes in a toe-out direction. Therefore, in addition to normal steering of a front wheel by operation of a steering wheel, by controlling the toe angle of the rear wheel W according to the vehicle speed or the steering angle of the steering wheel, it is possible to enhance the straight-line stability performance and the turning performance of the vehicle.

Figure 3:
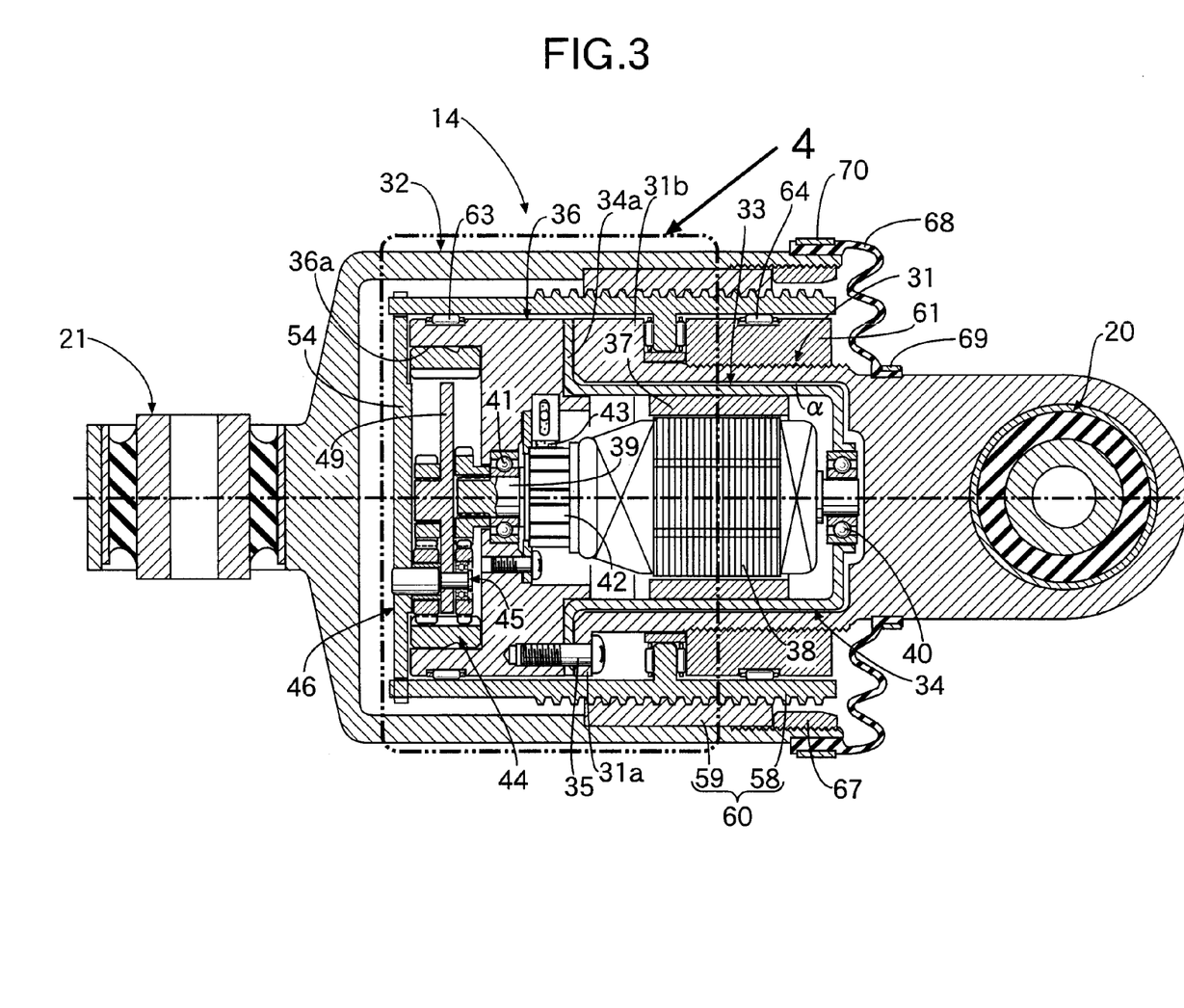
FIG. 3 is a vertical sectional view of a toe control actuator. (first embodiment)
Figure 4:
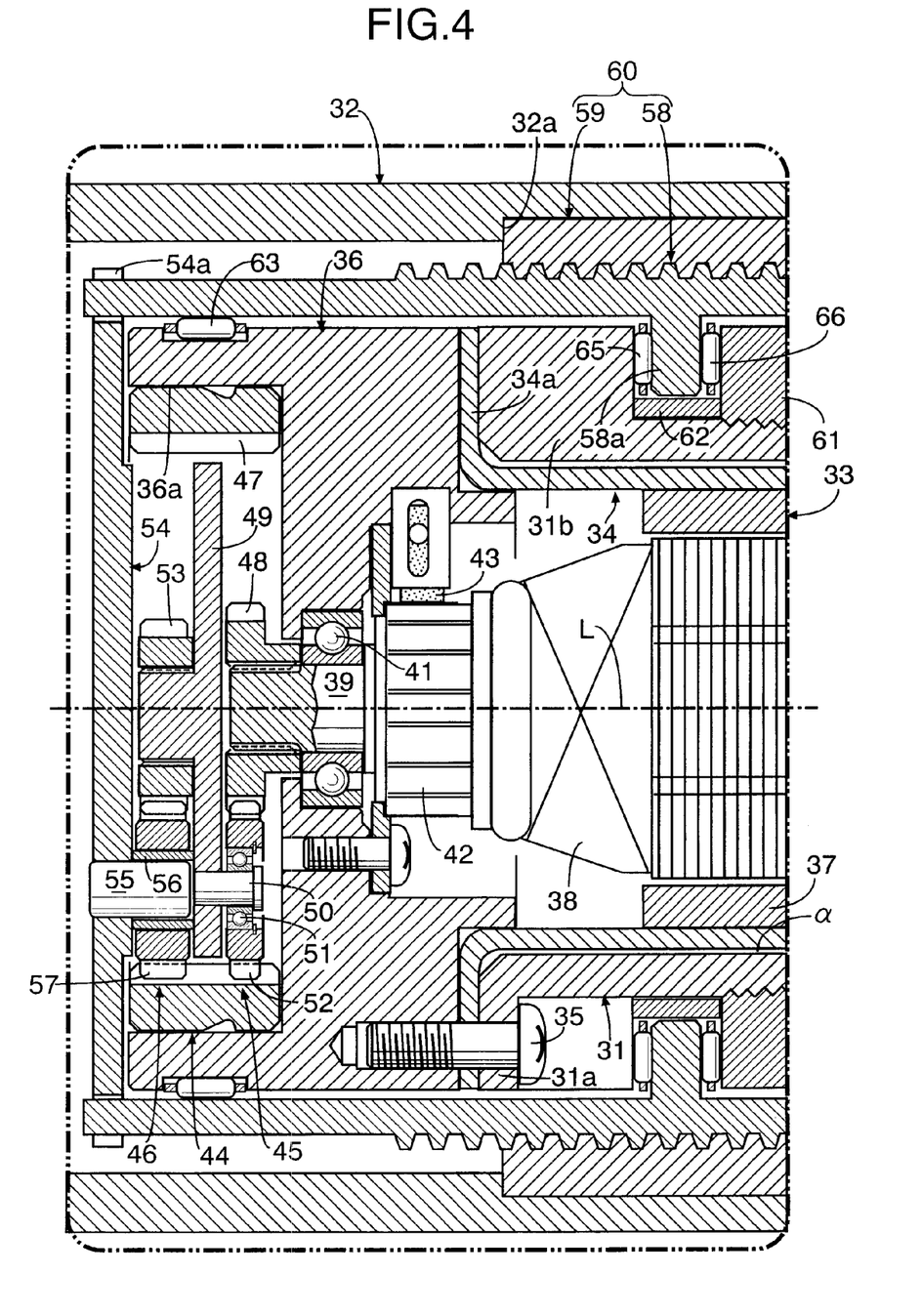
FIG. 4 is an enlarged view of part 4 in FIG. 3. (first embodiment)
Figure 5:
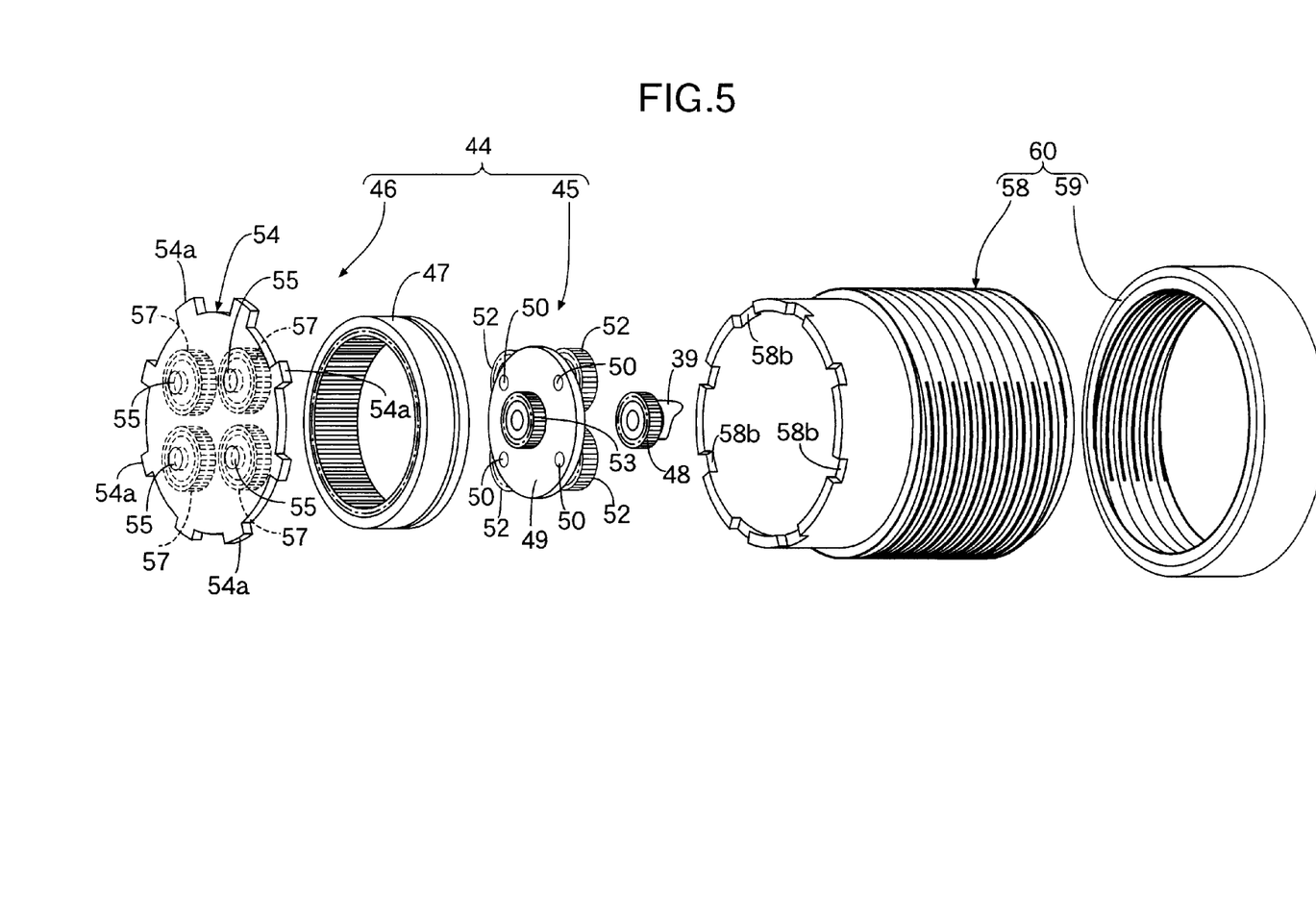
FIG. 5 is an exploded perspective view of a reduction gear and a screw feed mechanism. (first embodiment)

The structure of the toe control actuator 14 is now explained in detail by reference to FIG. 3 to FIG. 5.

The toe control actuator 14 includes a substantially cylindrical first housing 31 provided integrally with the rubber bush joint 20 connected to the vehicle body side, and a substantially cylindrical second housing 32 fitted around the outer periphery of the first housing 31 and provided integrally with the rubber bush joint 21 connected to the knuckle 11 side, the first and second housings 31 and 32 being disposed coaxially on an axis L. An outer shell of a motor 33 housed in the first housing 31 is formed from a yoke 34 formed in a cup shape having a flange 34a, and a bearing holder 36 secured to the flange 34a of the yoke 34 via a plurality of bolts 35. The bolts 35 securing the yoke 34 and the bearing holder 36 extend through a flange 31a formed on an opening of the first housing 31, and the motor 33 is fixed to the first housing 31 by utilizing the bolts 35.

With regard to a rotor 38 disposed within an annular stator 37 supported on an inner peripheral face of the yoke 34, one end of a rotating shaft 39 thereof is rotatably supported on a ball bearing 40 provided in a bottom part of the yoke 34, and the other end thereof is rotatably supported on a ball bearing 41 provided in the bearing holder 36. A brush 43 is supported on the inner face of the bearing holder 36, the brush 43 being in sliding contact with a commutator 42 provided on the outer periphery of the rotating shaft 39.

Since the outer shell of the motor 33 is formed from the yoke 34, which is a rigid component housing the stator 37 and the rotor 38, and this yoke 34 is fixed to the first housing 31, it is possible to make the first housing 31 receive a load inputted into the toe control actuator 14 from the rear wheel W, thus making it difficult for the load to act on the motor 33 and thereby enhancing the durability and reliability of the motor 33. Moreover, since a gap a is formed between an outer peripheral face of the yoke 34 of the motor 33 and an inner peripheral face of the first housing 31, not only is it possible for the gap a to suppress leakage of operating noise of the motor 33 to the exterior of the first housing 31, but it is also possible to more reliably prevent an external force acting on the first housing 31 from being transmitted to the motor 33.

A reduction gear 44 housed in an opening 36a formed in the bearing housing 36 on the side opposite to the motor 33 is formed by coupling a first planetary gear mechanism 45 and a second planetary gear mechanism 46 in two stages. The first planetary gear mechanism 45 is formed from a ring gear 47 fixed by being fitted into the opening 36a of the bearing housing 36, a first sun gear 48 fixed to the rotating shaft 39 of the motor 33, a disk-shaped first carrier 49, and four first pinions 52 rotatably supported via ball bearings 51 on first pinion pins 50 cantilever-supported by press-fitting into the first carrier 49 and simultaneously meshing with the ring gear 47 and the first sun gear 48. The first planetary gear mechanism 45 reduces the speed of rotation of the first sun gear 48, which is an input member, and transmits it to the first carrier 49, which is an output member.

The second planetary gear mechanism 46 of the reduction gear 44 is formed from the ring gear 47, which is common to the first planetary gear mechanism 45, a second sun gear 53 fixed to the center of the first carrier 49, a disk-shaped second carrier 54, and four second pinions 57 that are rotatably supported via slide bushes 56 on second pinion pins 55 cantilever-supported by press-fitting into the second carrier 54 and that simultaneously mesh with the ring gear 47 and the second sun gear 53. The second planetary gear mechanism 46 reduces the speed of rotation of the second sun gear 53, which is an input member, and transmits it to the second carrier 54, which is an output member.

By connecting the first and second planetary gear mechanisms 45 and 46 in series in this way, it is possible to obtain a large reduction ratio and, moreover, to reduce the size of the reduction gear 44.

A screw feed mechanism 60 formed from a male thread member 58 and a female thread member 59 is disposed so as to surround the outer periphery of the motor 33 and the reduction gear 44, which are disposed in series on the axis L. A spacer collar 62 is held between a large-diameter portion 31b of the first housing 31 and a locknut 61 screwed around the outer periphery of the first housing 31. The male thread member 58, which is substantially cylindrical and has a male thread formed on an outer peripheral face, is rotatably supported via an inner peripheral face on a needle bearing 63 provided on an outer peripheral face of the bearing holder 36 and a needle bearing 64 provided on an outer peripheral face of the locknut 61.

In this arrangement, an annular flange 58a projectingly provided on the inner peripheral face of the male thread member 58 is fitted into an annular groove formed, by means of the spacer collar 62, between the locknut 61 and the large-diameter portion 31b of the first housing 31, and opposite side faces thereof are supported by a pair of thrust bearings 65 and 66. The male thread member 58 is therefore supported so that it can rotate around the axis L while being restrained so that it is unable to move in the axis L direction.

A plurality of projections 54a formed on the outer periphery of the second carrier 54 of the second planetary gear mechanism 46 at predetermined intervals are engaged with a plurality of cutouts 58b formed in the outer periphery of one end part of the male thread member 58 at predetermined intervals, and rotation of the second carrier 54, which is the output member of the second planetary gear mechanism 46, is transmitted to the male thread member 58.

The female thread member 59, which is substantially cylindrical and is screwed onto the outer periphery of the male thread member 58, is fitted into an inner peripheral face of the second housing 32 and fixed by being pressed against a step portion 32a of the second housing 32 by means of a locknut 67. When the male thread member 58 rotates, the female thread member 59, into which it is screwed, therefore moves in the axis L direction.

In order to prevent water or dust from entering a gap between the first and second housings 31 and 32, opposite ends of a boot 68 are fitted onto an outer peripheral face of the first housing 31 and an outer peripheral face of the second housing 32 and are fixed by means of bands 69 and 70 respectively. Even if the first and second housings 31 and 32 expand or contract in the axis L direction and the internal pressure changes, the change in the internal pressure is absorbed by expansion or contraction of the boot 68.

When the motor 33 is driven, rotation of the rotating shaft 39 is inputted into the first sun gear 48 of the first planetary gear mechanism 45 of the reduction gear 44, reduced in speed, and outputted from the first carrier 49, and rotation of the first carrier 49 is inputted into the second sun gear 53 of the second planetary gear mechanism 46 of the reduction gear 44, reduced in speed, and outputted from the second carrier 54. When the male thread member 58 of the screw feed mechanism 60 connected to the second carrier 54 rotates, the female thread member 59, into which it is screwed, moves in the axis L direction, thus making the toe control actuator 14 expand or contract and thereby changing the toe angle of the rear wheel W.

With regard to this toe control actuator 14, since the screw feed mechanism 60 is disposed so as to surround outer peripheries of the motor 33 and the reduction gear 44 disposed on the axis L, compared with a case in which the motor 33, the reduction gear 44, and the screw feed mechanism 60 are disposed in series on the axis L, the dimension in the axis L direction thereof can be made smaller.

Embodiment 2

Figure 6:
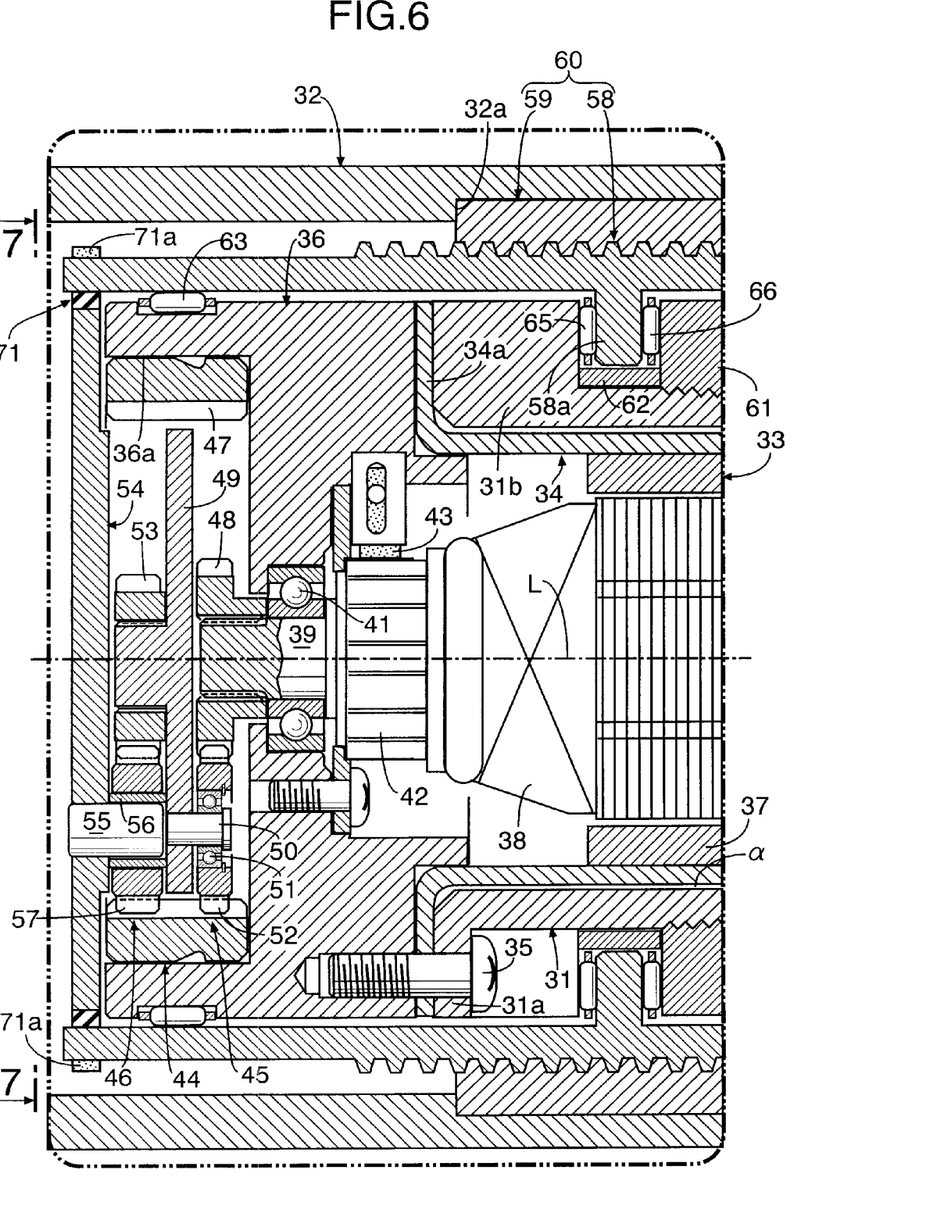
FIG. 6 is a view, corresponding to FIG. 4, related to a second embodiment. (second embodiment)
Figure 7:
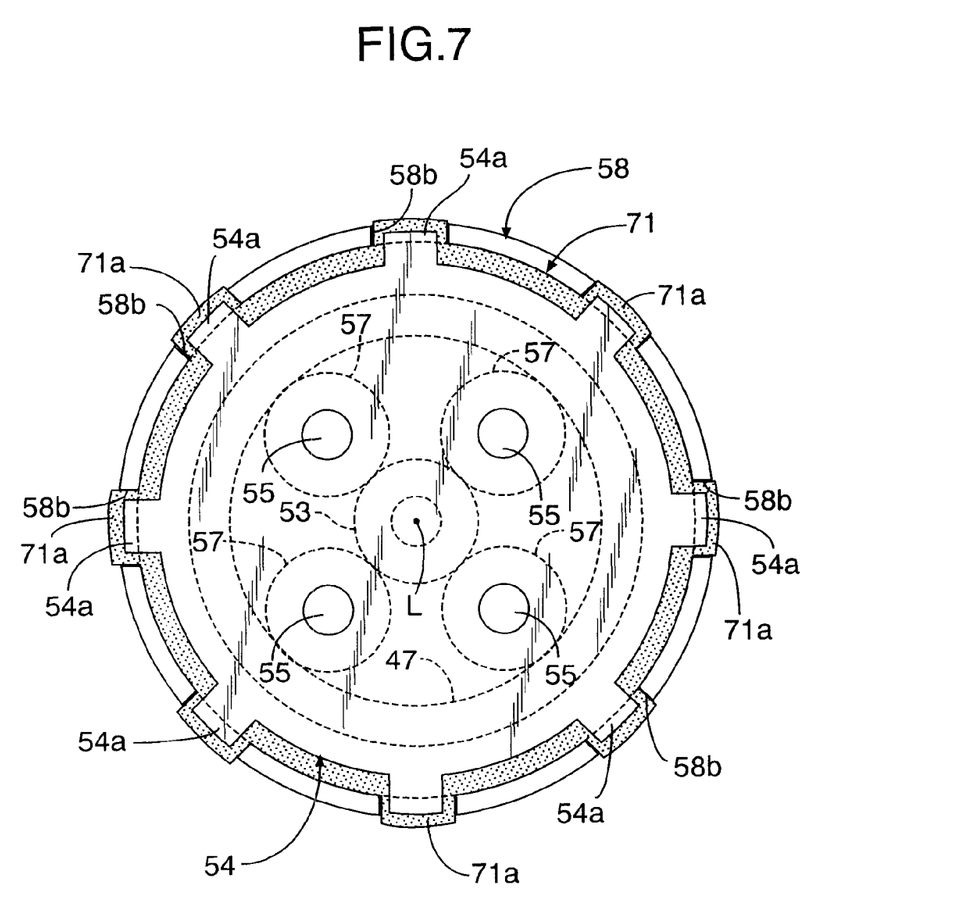
FIG. 7 is a view from arrowed line 7-7 in FIG. 6. (second embodiment)
Figure 8:
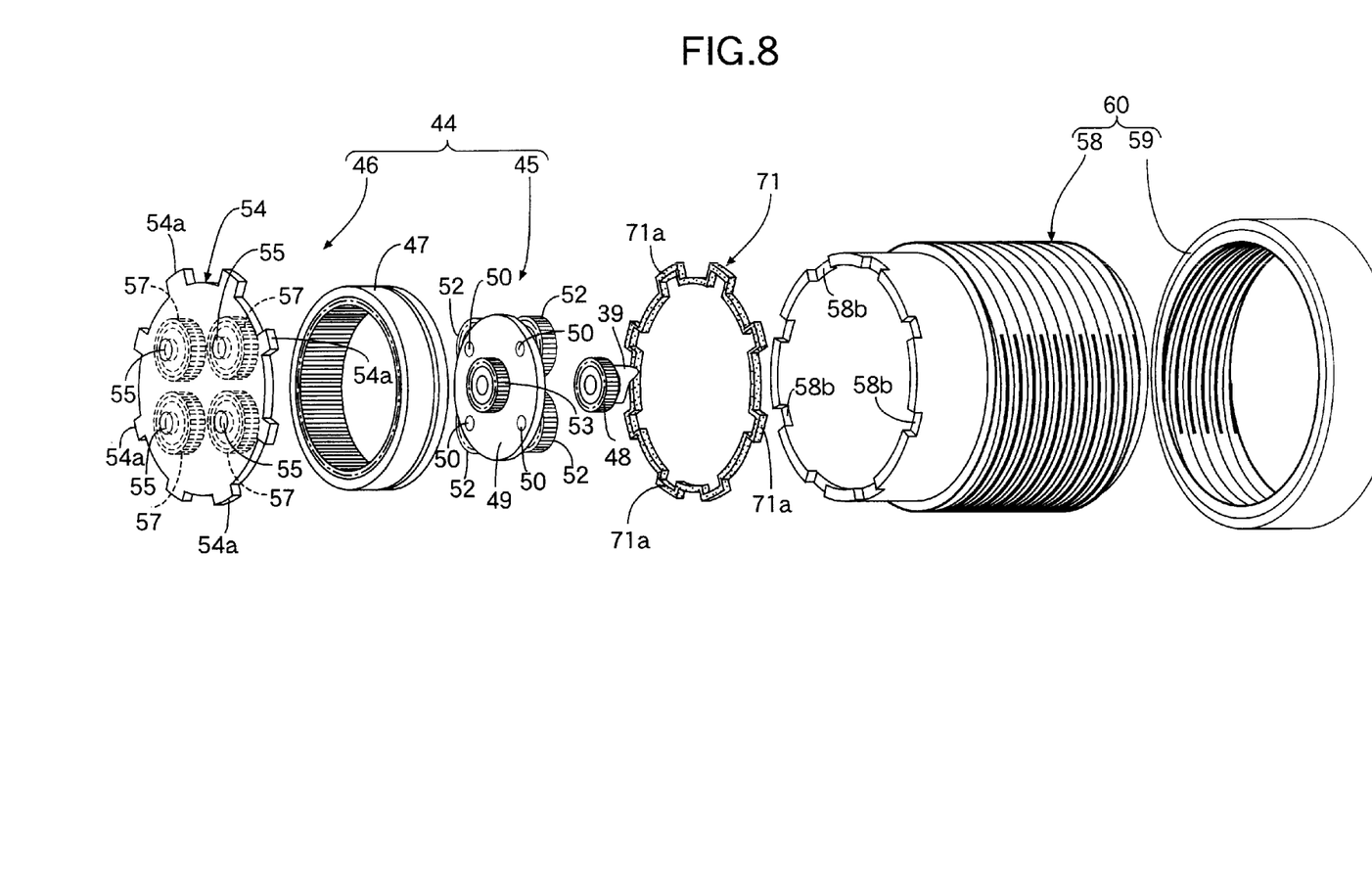
FIG. 8 is an exploded perspective view of a reduction gear and a screw feed mechanism. (second embodiment)

FIG. 6 to FIG. 8 show a second embodiment of the present invention.

In the second embodiment, a reduction gear 44 and a screw feed mechanism 60 are connected via a resilient coupling 71 made of a synthetic resin. The resilient coupling 71, which is formed in an annular shape, includes a plurality of projections 71a formed at predetermined intervals on the circumference, and these projections 71a are fixed so as to cover a plurality of projections 54a formed on a second carrier 54 of a second planetary gear mechanism 46. Therefore, when the plurality of projections 54a of the second carrier 54 are engaged with a plurality of cutouts 58b of a male thread member 58, the projections 71a of the resilient coupling 71 are present therebetween.

Resilient deformation of the resilient coupling 71 enables an automatic alignment function for absorbing a small displacement in the axis L between the reduction gear 44 and the screw feed mechanism 60 to be exhibited, and resilient deformation of the resilient coupling 71 absorbs sudden changes in torque and enables smooth power transmission to be carried out.

Embodiments of the present invention are explained above, but the present invention is not limited to the above-mentioned embodiments and may be modified in a variety of ways as long as the modifications do not depart from the present invention described in Claims.

For example, application of the expansion actuator of the present invention is not limited to the toe control actuator 14, which is explained in the embodiments, and may be applied to any use. If the present expansion actuator is applied to the toe control actuator 14, it is possible to reduce the unsprung load of the suspension S due to the small size and the light weight of the actuator.

Furthermore, in the embodiments, the screw feed mechanism 60 employs a trapezoidal thread, but another type of thread such as a ball thread may be used.

The invention claimed is:

1. An expansion actuator comprising:
a screw feed mechanism formed from a male thread member and a female thread member that are screwed one into the other is driven by a motor via a reduction gear,
wherein relative displacement between the male thread member and the female thread member in a direction of an axis is outputted as a thrust force,
wherein the motor and the reduction gear are disposed on the axis, and the screw feed mechanism is disposed so as to surround outer peripheries of the motor and the reduction gear, and
wherein the male screw member of the screw feed mechanism, which is connected to the reduction gear, is screwed with the female screw member at a position surrounding the outer periphery of the motor.

2. The expansion actuator according to claim 1, wherein the reduction gear and the screw feed mechanism are connected via a resilient coupling.

3. The expansion actuator according to claim 1, wherein the expansion actuator is a toe control actuator for changing a toe angle of a wheel of an automobile.

* * * * *